United States Patent
Hosking

[11] Patent Number: 5,679,184
[45] Date of Patent: Oct. 21, 1997

[54] PNEUMATIC MOUNTAIN BICYCLE OR MOTORCYCLE TIRE HAVING AN INNER TUBE COMPRESSION PUNCTURE PREVENTION DEVICE

[76] Inventor: Christopher J. Hosking, P.O. Box 8930, Mammoth Lakes, Calif. 93546

[21] Appl. No.: 728,930

[22] Filed: Oct. 11, 1996

Related U.S. Application Data

[63] Continuation of Ser. No. 435,186, May 5, 1995, abandoned.
[51] Int. Cl.⁶ .................... B60C 5/02; B60C 5/04; B60C 19/12; B60C 29/04
[52] U.S. Cl. .................... 152/157; 152/429; 152/501
[58] Field of Search .................... 152/501, 159, 152/157, 429

[56] References Cited

U.S. PATENT DOCUMENTS

| | | | |
|---|---|---|---|
| Re. 15,861 | 6/1924 | Beaney . | |
| 779,505 | 1/1905 | Stein | 152/501 X |
| 1,250,405 | 12/1917 | Williams | 152/157 |
| 1,338,110 | 4/1920 | Stocking | 152/501 X |
| 1,340,199 | 5/1920 | Williams | 152/157 |
| 1,347,439 | 7/1920 | Budd | 152/501 X |
| 1,412,601 | 4/1922 | Beaney . | |
| 1,416,187 | 5/1922 | Gammeter . | |
| 1,452,217 | 4/1923 | Pfeiffer | 152/501 X |
| 1,487,261 | 3/1924 | Oppenheimer . | |
| 1,488,998 | 4/1924 | Marshall | 152/157 |
| 1,533,566 | 4/1925 | Nantes . | |
| 1,538,202 | 5/1925 | Moore | 152/501 X |
| 1,600,799 | 9/1926 | Clark . | |
| 1,614,286 | 1/1927 | Cullen . | |
| 1,621,021 | 3/1927 | Medynski . | |
| 2,109,383 | 2/1938 | Gallardo | 152/157 |
| 4,125,660 | 11/1978 | White et al. | 152/157 X |
| 4,877,071 | 10/1989 | Tanigawa et al. | 152/157 X |

*Primary Examiner*—Adrienne C. Johnstone
*Attorney, Agent, or Firm*—Kelly Bauersfeld Lowry & Kelley, LLP

[57] ABSTRACT

A device for preventing a pinch puncture of an inner tube of a pneumatic tire, which is disposed within a tire casing fitted over a wheel rim, includes a resiliently deformable ring disposed between the inner tube and the rim. The ring includes a flat base section positioned within a radially outwardly facing channel of the rim, an intermediate section which extends from the base section radially outwardly substantially beyond an outer periphery of the rim, and an outer section which defines an inner tube supporting cradle. The intermediate section of the ring includes a neck having a reduced width relative to the base section. The outer section has a width greater than that of the base. A radial aperture is provided through the ring for a valve stem, and a valve stem extension is provided to extend from the inner tube valve stem radially inwardly through the rim. The ring is preferably formed of a polyurethane material having a 90 Shore A durometer hardness.

18 Claims, 1 Drawing Sheet

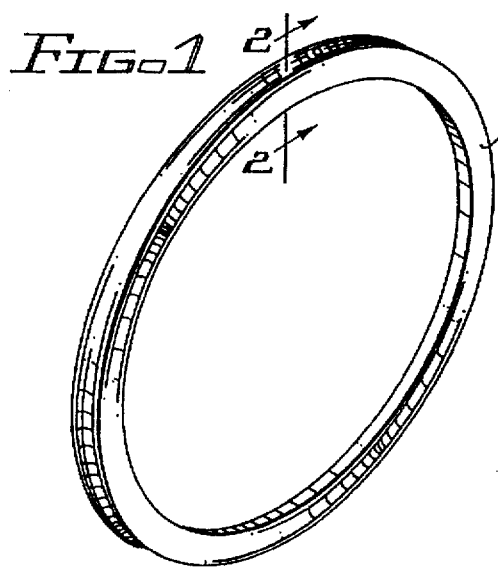
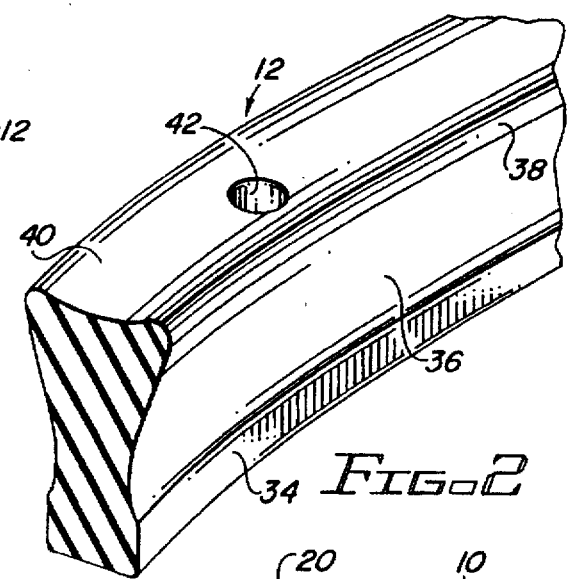
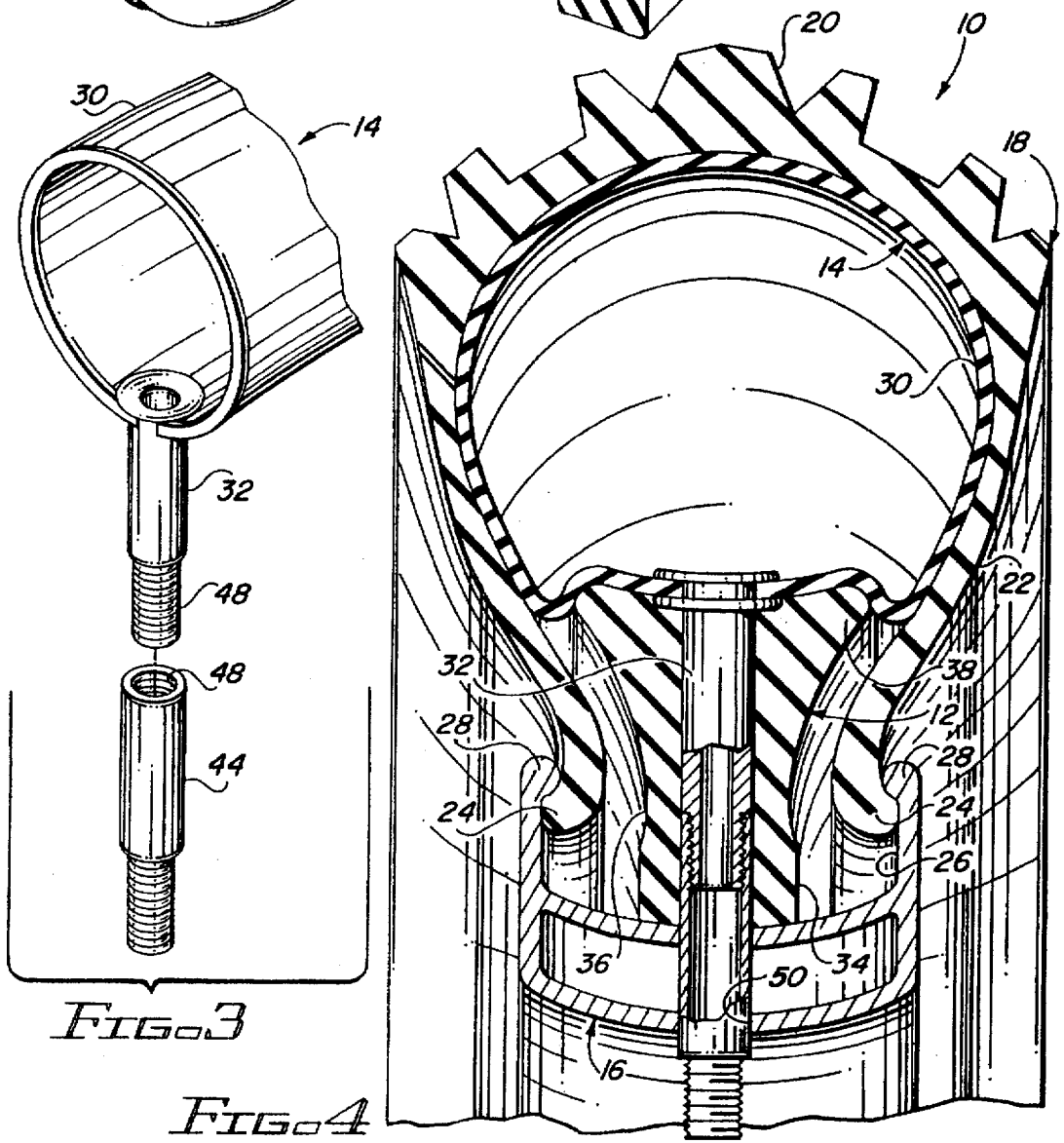

PNEUMATIC MOUNTAIN BICYCLE OR MOTORCYCLE TIRE HAVING AN INNER TUBE COMPRESSION PUNCTURE PREVENTION DEVICE

This is a continuation, of application Ser. No. 08/435,186, filed May 5, 1995 now abandoned.

BACKGROUND OF THE INVENTION

This invention relates generally to pneumatic tires. More specifically, the present invention relates to a device for preventing a pinch puncture of an inner tube of a pneumatic tire during rapid tire compression.

Those involved in mountain bicycle riding are well aware of tire "snake bite" problems typically encountered during downhill or cross country riding at high speeds on rough terrain. A "snake bite" is a pinch puncture of the tire inner tube which occurs when a rider bumps into a sharp obstacle. Under such conditions the tire casing may be forced against the rim, pinching the inner tube in the process. Often this causes a pinch puncture of the inner tube, resulting in the downhill ride ending with a flat tire.

The problem of "snake bites" occurring during downhill racing is sufficiently serious that tire manufacturers have devoted substantial research and development efforts in attempts to solve the problem. Some manufacturers have resorted to extensive computer simulations in attempts to design new tire types that would prevent the inner tube from being pinched during the rapid tire compression typical in mountain bike downhilling. The result of such research and development activities has been a new tire including sidewall reinforcement. A drawback, however, of the new reinforced tire designs is that such new tires are substantially more expensive than standard mountain bike tires and do not perform as well.

Accordingly, there has been a need for a device for preventing a pinch puncture of an inner tube of a pneumatic tire, that can be used with standard pneumatic tire components and which is especially useful with mountain bike and motorcycle tires. Such a device must be$_{35}$ capable of being utilized with existing pneumatic tires without significantly changing the tires' overall handling characteristics. Moreover, such a device and the resultant pneumatic tire must effectively prevent the tube from being pinched between the tire casing and the rim during rapid tire compression. The present invention fulfills these needs and provides other related advantages.

SUMMARY OF THE INVENTION

The present invention resides in a pneumatic tire and a device for preventing a pinch puncture of an inner tube within the pneumatic tire. The improved pneumatic tire comprises a tire casing fitted over the rim of the wheel, an inflatable inner tube situated within the tire casing, and resiliently deformable means for preventing pinch flats of the inner tube resulting from rapid compression of the tire casing into engagement with the rim. The preventing means is disposed between the rim and the inner tube.

In a preferred form of the invention, the preventing means is an inner tube puncture prevention ring which has a base section that is supported within a radially outwardly facing channel of the rim, an intermediate section which extends from the base section radially outwardly substantially beyond an outer periphery of the rim, and an outer section which defines a radially outwardly facing inner tube supporting cradle. The intermediate section includes a neck having a reduced width relative to the base, which is located proximate to the outer periphery of the rim. The outer section has a width greater than that of the base.

The puncture prevention ring also includes a radial aperture through which a valve stem of the inner tube extends. Since the valve stem is typically not long enough to completely extend through the rim when utilizing the puncture prevention ring, a valve stem extension is connected to the inner tube valve stem.

The puncture prevention ring preferably comprises a resiliently deformable elastomeric material. In the disclosed embodiment, this elastomeric material is a polyurethane having a 90 Shore A durometer hardness.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a resiliently deformable ring embodying the invention which, when placed within a pneumatic tire between the inner tube and the rim, prevents pinch punctures of the inner tube;

FIG. 2 is an enlarged vertical section taken generally along the line 2—2 of FIG. 1;

FIG. 3 is a partially sectional exploded perspective view of an inner tube having a valve stem, and a valve stem extension; and FIG. 4 is an elevational section illustrating the placement of the deformable ring within a pneumatic tire so as to be disposed between the inner tube and the rim.

DETAILED DESCRIPTION OF THE PREFERRED EMBODIMENT

As shown in the drawings for purposes of illustration, the present invention is concerned with an improved pneumatic tire, generally illustrated in FIG. 4 by the reference number 10, and more specifically with a resiliently deformable ring 12 which, when placed within the pneumatic tire between an inner tube 14 and a rim 16, prevents pinch punctures or "snake bites" of the inner tube.

A typical pneumatic tire 10 comprises a tire casing 18 supported on the rim 16, and an inner tube 14 disposed within the tire casing. The tire casing 18 includes a tread portion 20 and tire sidewalls 22 which extend from the tread portion radially inwardly toward the rim 16. The sidewalls 22 terminate in annular beads 24 which are positioned within a radially outwardly facing channel 26 of the rim 16. The rim 16 includes oppositely facing annular channel flanges 28 which define the outermost radial extent of the rim. These channel flanges 28 provide supporting surfaces for the tire beads 24.

The inner tube 14 includes a tube portion 30 usually constructed of a rubber-like flexible material, and a valve stem 32 through which air is pumped to inflate the tube portion 30. In a typical mountain bike tire, the valve stem 32 houses a "presta" valve.

In accordance with the present invention, the ring 12 is disposed between the inner tube 14 and the rim 16, and is configured to prevent the inner tube from being pinched between the tire casing 18 and the rim 16 during rapid tire compression of the type encountered during downhill mountain biking. The ring 12 includes a base 34 which is positioned within the rim channel 26, an intermediate section 36 which extends from the base radially outwardly substantially beyond an outer periphery of the rim 16 to an outer section 38. The outer section 38 defines an inner tube supporting cradle 40 which directly bears against the radially inwardly facing surface of the inner tube 14. The intermediate section 36 includes a neck which has a reduced width relative to the base 34 proximate to the outer periphery of the rim 16 when properly positioned thereon. Further, the outer section 38 has a width greater than that of the base 34.

More particularly, the illustrated ring 12 has a width, in cross-section, at the base 34 of 9 mm and a width at the neck of the intermediate section 36 of 8 mm. The width of the outer section 38 is 17 min. Further, the inner radius of the ring 12 is 277.5 mm, wherein the outermost radius of the ring 12 is 298.5 mm.

The ring 12 is preferably manufactured of a resiliently deformable elastomeric material having a 90 Shore A durometer hardnes Specifically, a polyurethane material is preferred. This ensures that the ring 12 has sufficient flexibility to be stretched over the rim 16 and yet provide sufficient resistance to rapid tire compression which could cause pinch punctures of the inner tube 14.

The ring 12 further includes a valve stem aperture 42 through which the valve stem 32 extends when the inner tube 14 is positioned adjacent to the cradle surface 40 of the ring 12. A valve extension 44 is provided to extend the length of the valve stem so that it can extend through an aperture 50 through the rim 16 in a standard manner. The valve extension 44 includes a female threaded section 46 that may be screwed onto a male threaded section 48 at the end of the inner tube valve stem 32.

Assembly of a pneumatic tire 10 including the resiliently deformable ring 12 will now be described. By way of pre-installation steps, the ring 12 should preferably be at room temperature, and if a new tire casing 18 is to be used the casing may be pre-stretched by installing it on the rim 16 with the inner tube 14 in place, in a standard fashion, and inflating the tire to the maximum recommended pressure. Further, if installing a new tire casing 18 or inner tube 14, talc coat the inside of the tire casing 18 and the beads 24, and the entire exterior surface of the inner tube 14. If the pneumatic tire 10 has been assembled as recommended above without the ring 12, it must be disassembled prior to proceeding further.

To assemble the pneumatic tire 10 with the ring 12, one should first insert the valve stem 32 of the inner tube 14 through the aperture 42 and attach the valve extension 44 to the valve stem 32. The terminal end of the valve extension 44 should then be placed through the valve stem aperture 50 of the rim 16. With the inner tube 14 positioned over the ring 12, the ring should be stretched on the rim 16 so as to position the base 34 within the rim channel 26. The final portion of the ring 12 so fitted into the rim 16 should snap into place since the entire lower surface of the base 34 should securely contact the base of the rim channel 26. At this point the inner tube 14 may be taken off the ring 12, and the valve stem aperture 42 of the ring 12 will now be aligned with the rim aperture 50.

Next, the tire casing 18 should be fit over the assembled rim 16 and ring 12. The inner tube 14 is then partially inflated (just enough to give it some shape) and the valve stem 32 with its valve extension 44 is inserted through the valve stem aperture 42 so that the terminal end of the valve extension 44 extends through the rim aperture 50. The inner tube 14 is then worked around the ring 12 to position it over the outer section 38 into contact with the cradle 40.

The tire beads 24 are assembled to the rim 16 in the standard manner. At this point it may be necessary to let a small amount of air out of the inner tube 14. After assembling the tire casing 18 to the rim 16, the inner tube 14 should be slightly inflated to test if the tire casing 18 runs true on the rim 16 when the wheel is spun. If not, the tube 14 may be moved side to side until it centers itself.

From the foregoing it will be appreciated that the novel pneumatic tire 10 including the resiliently deformable ring 12 is capable of effectively preventing pinch punctures which occur on rapid tire compression typical in mountain bike downhill racing. Additionally, use of the ring 12 prevents minor rim damage which often occurs even when the tire impact is not sufficient to cause a "snake bite". However, in those instances where the impact is sufficient to cause severe rim damage, inclusion of the ring 12 within the tire 10 will, in most cases, prevent occurrence of a pinch puncture, thus vastly improving the safety of the pneumatic tire 10. Further, the ring 12 prevents ripping out the valve stems due to "tire creep" about the rim, and also provides the tire 10 a limited ride-flat capability.

Although a particular embodiment of the invention has been described in detail for purposes of illustration, various modifications may be made without departing from the spirit and scope of the invention. Accordingly, the invention is not to be limited, except as by the appended claims.

I claim:

1. A pneumatic mountain bicycle or motorcycle tire supported by the rim of a wheel, comprising:

a tire casing fitted over the wheel rim;

an air-inflated inner tube within the tire casing; and a resiliently deformable inner tube puncture prevention ring disposed between the rim and the inner tube and having a base that is supported within a radially outwardly facing channel of the rim, and a radially outwardly facing inner tube supporting cradle situated beyond an outer periphery of the rim for preventing compression punctures of the inner tube during rapid compression of the tire casing into engagement with the rim.

2. The pneumatic tire of claim 1, wherein the puncture prevention ring includes a radial aperture through which a valve stem of the inner tube extends.

3. The pneumatic tire of claim 2, including a valve stem extension connected to the inner tube valve stem and extending radially inwardly through the rim.

4. The pneumatic tire of claim 1, wherein the puncture prevention ring comprises a resiliently deformable elastomeric material.

5. The pneumatic tire of claim 4, wherein the resiliently deformable elastomeric material is a polyurethane material having a 90 Shore A durometer hardness.

6. The pneumatic tire of claim 1, wherein the puncture prevention ring includes an intermediate section extending from the base radially outwardly substantially beyond the outer periphery of the rim, to an outer section which defines the inner tube supporting cradle.

7. The pneumatic tire of claim 6, wherein the intermediate section includes a neck having a reduced width relative to the base proximate to the outer periphery of the rim.

8. The pneumatic tire of claim 7, wherein the outer section has a width greater than that of the base.

9. A pneumatic mountain bicycle or motorcycle tire supported by the rim of a wheel, comprising:

a tire casing fitted over the wheel rim;

an inflatable inner tube within the tire casing; and a resiliently deformable ring disposed between the inner tube and the rim, the ring including a base supported within a radially outwardly facing channel of the rim, a radially outwardly facing inner tube supporting cradle situated beyond an outer periphery of the rim for preventing pinch flats of the inner tube during rapid compression of the tire casing into engagement with the rim, and an intermediate section extending from the base radially outwardly substantially beyond the outer periphery of the rim to an outer section defining the inner tube supporting cradle.

10. The pneumatic tire of claim 9, wherein the intermediate section includes a neck having a reduced width relative to the base proximate to the outer periphery of the rim, and wherein the outer section has a width greater than that of the base.

11. The pneumatic tire of claim 10, wherein the ring comprises a resiliently deformable elastomeric material.

12. The pneumatic tire of claim 11, wherein the resiliently deformable elastomeric material is a polyurethane material having a 90 Shore A durometer hardness.

13. The pneumatic tire of claim 9, wherein the ring includes a radial aperture through which a valve stem of the inner tube extends.

14. The pneumatic tire of claim 13, including a valve stem extension connected to the inner tube valve stem and extending radially inwardly through the rim.

15. A pneumatic mountain bicycle or motorcycle tire supported by the rim of a wheel, comprising:

a tire casing fitted over the wheel rim and having a pair of oppositely facing beads supported within a radially outwardly facing channel of the rim;

an inflatable inner tube within the tire casing; and an inner tube puncture prevention ring disposed between the rim and the inner tube, having a base section supported within the outwardly facing channel of the rim, a radially outwardly facing inner tube supporting cradle situated beyond an outer periphery of the rim for preventing compression punctures of the inner tube during rapid compression of the tire casing into engagement with the rim, and an intermediate section extending from the base radially outwardly substantially beyond the outer periphery of the rim to an outer section defining the inner tube supporting cradle, wherein the intermediate section includes a neck having a reduced width relative to the base proximate to the outer periphery of the rim, the outer section has a width greater than that of the base, and wherein the puncture prevention ring comprises a resiliently deformable elastomeric material.

16. The pneumatic tire of claim 15, wherein the puncture prevention ring includes a radial aperture through which a valve stem of the inner tube extends, and further including a valve stem extension connected to the inner tube valve stem and extending radially inwardly through the rim.

17. The pneumatic tire of claim 15, wherein the resiliently deformable elastomeric material has a 90 Shore A durometer hardness.

18. The pneumatic tire of claim 17, wherein the elastomeric material is polyurethane.

* * * * *